United States Patent [19]

Kennedy et al.

[11] Patent Number: 5,812,741
[45] Date of Patent: Sep. 22, 1998

[54] SERIAL SEQUENCERS CONNECTED IN PARALLEL

[75] Inventors: William R. Kennedy; John M. Kennedy, both of Taylorville, Ill.

[73] Assignee: Jack Kennedy Metal Products and Buildings, Inc., Taylorville, Ill.

[21] Appl. No.: 601,575

[22] Filed: Feb. 14, 1996

[51] Int. Cl.⁶ .................................................. C06F 15/18
[52] U.S. Cl. ................................................................ 395/83
[58] Field of Search .................................. 395/83, 82, 84

[56] References Cited

U.S. PATENT DOCUMENTS

| | | | |
|---|---|---|---|
| 4,394,725 | 7/1983 | Bienvenu et al. | 395/676 |
| 4,809,159 | 2/1989 | Sowa | 395/800.25 |
| 4,837,735 | 6/1989 | Allen, Jr. et al. | 395/11 |
| 5,225,975 | 7/1993 | Gates et al. | 364/147 |
| 5,437,045 | 7/1995 | Davies | 395/800.16 |
| 5,671,377 | 9/1997 | Bleidt et al. | 345/328 |

*Primary Examiner*—Allen R. MacDonald
*Assistant Examiner*—Sanjiv Shah
*Attorney, Agent, or Firm*—Senniger, Powers, Leavitt & Roedel

[57] ABSTRACT

A system for controlling a first device having a first input for controlling operation of the first device and having a first output indicating status of the first device, and a second device operating in conjunction with the first device and having a second input for controlling operation of the second device and having a second output indicating status of the second device. The system includes first and second serial sequencers. The first serial sequencer controls the first device, wherein the first output of the first device is a first shared output. The first sequencer has an input connected to the first shared output of the first device for monitoring the status of the first device, and has an output connected to the first input of the first device for controlling operation of the first device. The second serial sequencer controls the second device and has an input connected to the first shared output of the first device for monitoring the status of the first device, another input connected to the second output of the second device for monitoring the status of the second device, and an output connected to the second input of the second device for controlling operation of the second device. The first and second serial sequencers operate simultaneously in parallel.

13 Claims, 8 Drawing Sheets

SERIAL SEQUENCERS CONNECTED IN PARALLEL

BACKGROUND OF THE INVENTION

Sequencers are well-known in the prior art. For example, U.S. Pat. No. 4,809,159, incorporated herein by reference in its entirety, discloses a control token mechanism for sequence-dependent instruction execution in a multi-processor. In general, such sequencers operate in steps. Normally, the steps are followed in order. The devices to be controlled are assigned outputs. For example, if there are five devices to be controlled, a first set of outputs would be connected to the first device, a second set of outputs would be connected to the second device and so on. Sensors control the operation of the sequencer by providing input signals to the sequencer. If five devices are controlled by a single sequencer, only one device at a time would usually be operational. This is because the sequencer only executes one step at a time which would mean that only one device is being actuated. Consequently, the five devices would operate in dependence upon each other and would not operate simultaneously.

Sequential operation of a system can also be accomplished by programmable logic controllers (PLC) which can provide for simultaneous operation or for independent operation, to a certain extent. However, programmable logic controllers are very difficult to program and the ability to allow independent and simultaneous operation of devices is limited.

Therefore, there is a need for a system which can be easily programmed to simultaneously control several devices independently.

SUMMARY OF THE INVENTION

It is an object of this invention to provide a system which simultaneously and independently operates a plurality of devices and which is easily programmable.

It is another object of this invention to provide a system which employs serial sequencers operating in parallel, each sequencer operating a separate device so that the devices may be simultaneously and independently operated.

It is another object of this invention to provide serial sequencers which are connected in parallel which have shared outputs and shared inputs so that one sequencer would have outputs which are responsive to other sequencers.

It is another object of this invention to provide systems of serial sequencers, each sequencer having flags, the sequencers responsive to flags of other sequencers and/or the sequencers resetting the flags of other sequencers.

In one form the invention constitutes a system for controlling a first device and a second device. The first device has a first input for controlling its operation and has a first output indicating its status.. The second device operates in conjunction with the first device and has a second input for controlling its operation and has a second output indicating its status. The system comprises first and second serial sequencers. The first serial sequencer controls the first device, wherein the first output of the first device is a first shared output. The first serial sequencer has an input connected to the first shared output of the first device for monitoring the status of the first device, and an output connected to the first input of the first device for controlling operation of the first device. The second serial sequencer controls the second device and has an input connected to the first shared output of the first device for monitoring the status of the first device, another input connected to the second output of the second device for monitoring the status of the second device, and an output connected to the second input of the second device for controlling operation of the second device. The first and second serial sequencers operate simultaneously in parallel and independently of each other so that the first device is controlled by the first serial sequencer and the second device is controlled by the second serial sequencer in response to the status of the first device.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
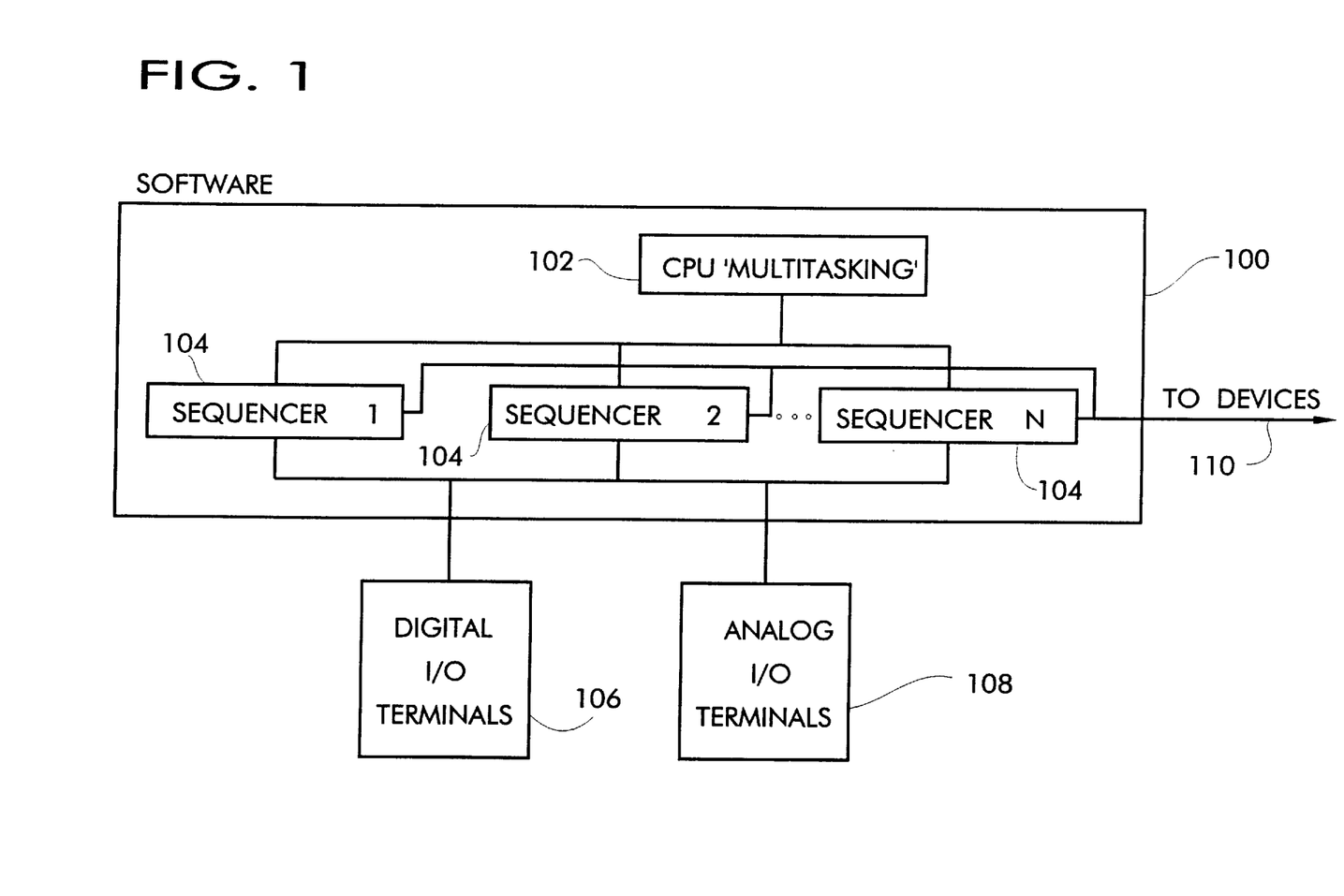
FIG. 1 is a block diagram of one preferred embodiment of the software according to the invention.

As illustrated in FIG. 1, one preferred embodiment of the invention comprises multi-tasking software 100 including a CPU multi-tasking operating system 102 and a plurality of sequencer control modules 104 which are responsive to digital input/output (I/O) terminals 106 and analog I/O terminals 108. Each sequencer module 104 operates in steps. Normally, the steps are followed in order. The devices to be controlled are assigned outputs 110 for receiving signals from the software 100 that control their operation. Each sequencing module 104 operates simultaneously in parallel with the other sequencer modules and independently of each other so that the first sequencer module controls its devices, the second sequencer module controls its devices and so on so that all N sequencer modules separately and independently control their devices. However, each sequencer module 104 is responsive to both the digital I/O terminals 106 and the analog I/O terminals 108 which would be receiving inputs from any of the devices of the system.

Figure 2:
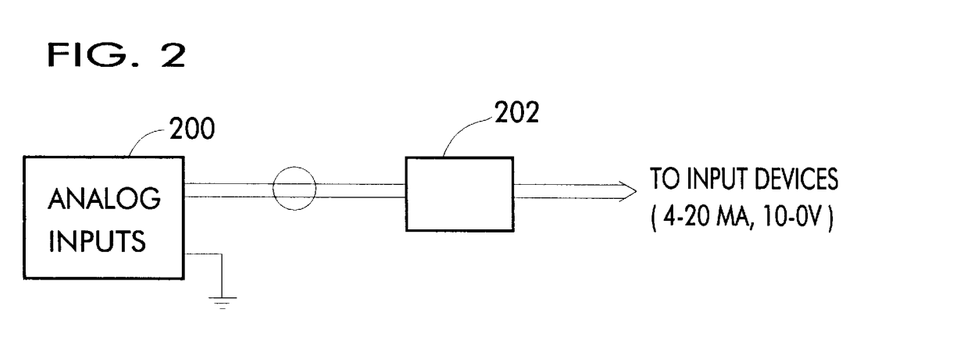
FIG. 2 is a block diagram of one preferred embodiment of the analog input/output terminals of the invention.
Figure 3:
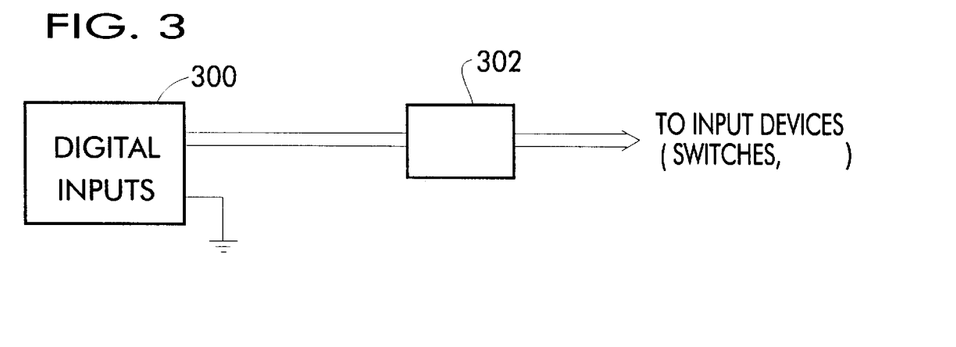
FIG. 3 is a block diagram of one preferred embodiment of the digital input/output terminals of the invention.

FIG. 2 illustrates the analog I/O terminals 108. The analog inputs 200 are provided to the system through a signal conditioning circuit 202 which may include a spike absorbing inductor or inductor/capacitor network or other conditioning circuits well-known in the art which protect the hardware from out-of-range analog signals. Similarly, FIG. 3 illustrates that the digital inputs 300 are also provided through a signal conditioning circuit 302 for absorbing spikes, and such circuits may include capacitors and pull up resistors.

Figure 4:
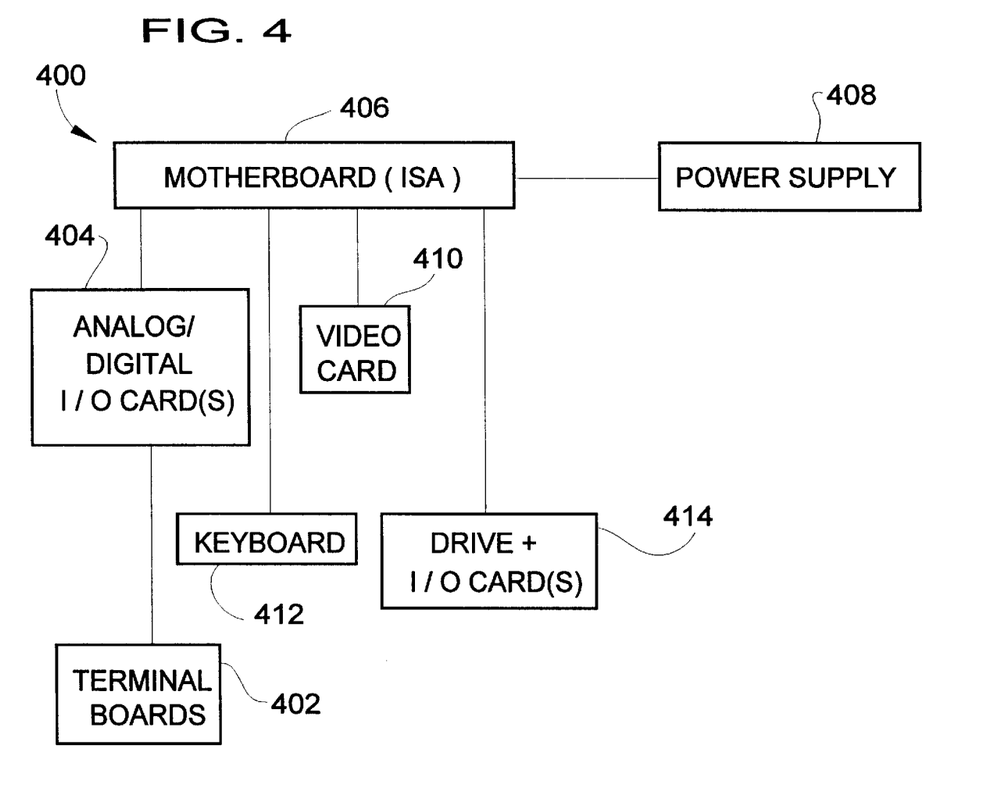
FIG. 4 is a block diagram of one preferred embodiment of the hardware according to the invention.

FIG. 4 is a block diagram of the hardware according to the invention. Terminal boards 402 receive the input signals from the analog and digital inputs and provide such signals to the analog/digital I/O cards 404 within the computer 400. Cards 400 communicate with the mother board 406 which may be a standard ISA board driven by a power supply 408. The mother board 406 would also interface with one or more video cards 410 for driving a monitor which may be viewed by an operator, a keyboard 412 for permitting operator input and other driver and I/O cards 414.

Figure 5:
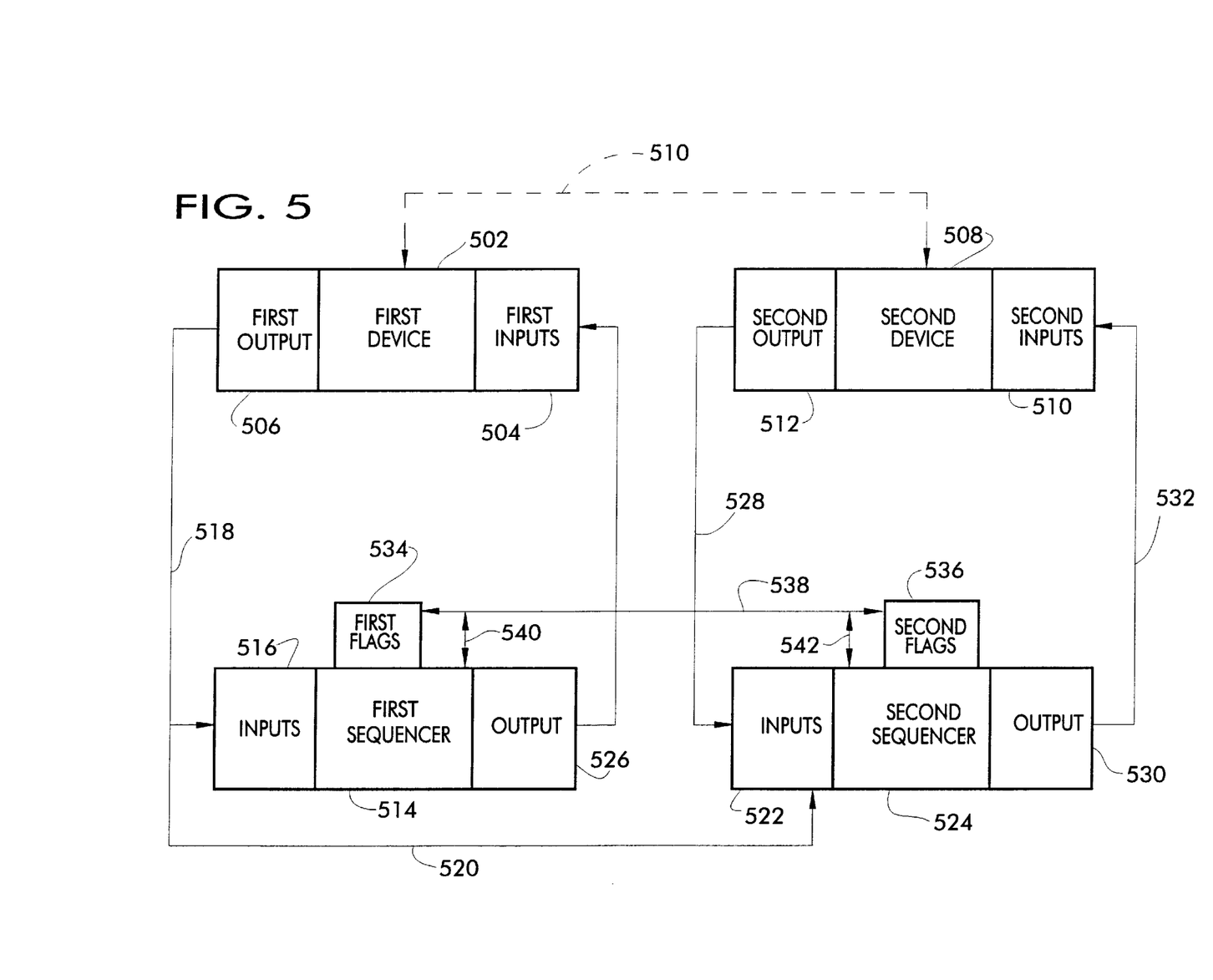
FIG. 5 is block diagram of one preferred embodiment of a system according to the invention in which an output of a first device is shared by first and second sequencers.

FIG. 5 illustrates one preferred embodiment of a block diagram of a system according to the invention in which the outputs of a first device are shared by first and second sequencers. In particular, a first device 502 has first inputs 504 for controlling the operation of the first device 502. In addition, the first device 502 has first outputs 506 indicating the status of the first device 502. Similarly, a second device 508 operating in conjunction with the first device 502, such conjunct operation being indicated by dashed line 510. The second device 508 has second inputs 510 for controlling the operation of the second device 508 and also has second outputs 512 for indicating the status of the second device 508. A first serial sequencer 514 is provided for controlling the first device 502. The first outputs 506 of the first device 502 are shared outputs in that they are supplied to the inputs 516 of the first sequencer 514 via line 518 and are also supplied via line 520 to the inputs 522 of a second sequencer 524 for controlling the second device 508. The inputs 516 of the first sequencer 514 monitor the status of the first device 502. First sequencer 514 also includes outputs 526 connected to the first inputs 504 for controlling the operation of the first device 502.

The second serial sequencer 524 includes inputs 522 which are connected to both the first outputs 506 of the first device 502 (via lines 518 and 520) and also connected to the second outputs 512 of the second device 508 via line 528. The interconnection between the second outputs 512 and the inputs 522 of the second sequencer 524 allow the second sequencer to monitor the status of the second device 508. The second sequencer 524 also includes outputs 530 which are connected to the second inputs 510 of the second device 508 via line 532 for controlling the operation of the second device 508.

The first sequencer operates simultaneously with the second sequencer and in parallel with the second sequencer in that the first sequencer 514 has a plurality of steps for controlling the first device 502. Similarly, the second sequencer operates simultaneously and in parallel with the first sequencer 514 by executing a series of steps for controlling the operation of the second device 508. Therefore, the first sequencer 514 and the second sequencer 524 operate independent of each other to the extent that each executes a series of steps allowing the first device 502 to operate independently of the second device 508. In addition, because of the link provided via line 520 between the first outputs 506 of the first device and the inputs 522 of the second sequencer, the second device 508 is controlled by the second serial sequencer 524 in response to the status of the first device 502.

Although FIG. 5 is illustrated with only two devices and two sequencers, it is contemplated that the invention may be implemented with any number of devices and corresponding sequencers. In fact, the greater the number of devices and corresponding sequencers, the more benefit the invention provides in that it simplifies the control processes which would otherwise have to accomplished by a single sequencer. As shown in FIG. 5, first sequencer 514 provides first flags 534 which assist the first sequencer 514 in controlling the operation of first device 502. Similarly, second sequencer 524 provides second flags 536 for assisting in the control of second device 508. In each case, a flag is generally as an indication that a particular step should be inhibited or that a particular step can proceed. Usually, the sequencers operate according to a timing pattern to execute a series of steps according to certain timing. In addition, certain flags must be set or reset in order to allow the series of steps to proceed. In general, it is contemplated that the sequencers may look at their own flags or the flags of any other sequencer to assist in determining the next step to be performed. Similarly, any sequencer can reset its own flag or a flag of any other sequencer. In order to illustrate this inner-dependence between the sequencers and flags, lines 538, 540, and 542 interconnect the first sequencer 514 and its flags 534 and the second sequencer 524 and its flags 536. For example, first sequencer 514 may look at and respond to second flags 536 via lines 540 and 538 and may reset such flags according to these lines. Similarly, second sequencer 524 may look at, respond to and/or reset first flags 534 via lines 538 and 542. Of course, the first sequencer can reset its own first flags 534 and the second sequencer 524 may reset its own second flags 536.

Figure 6:
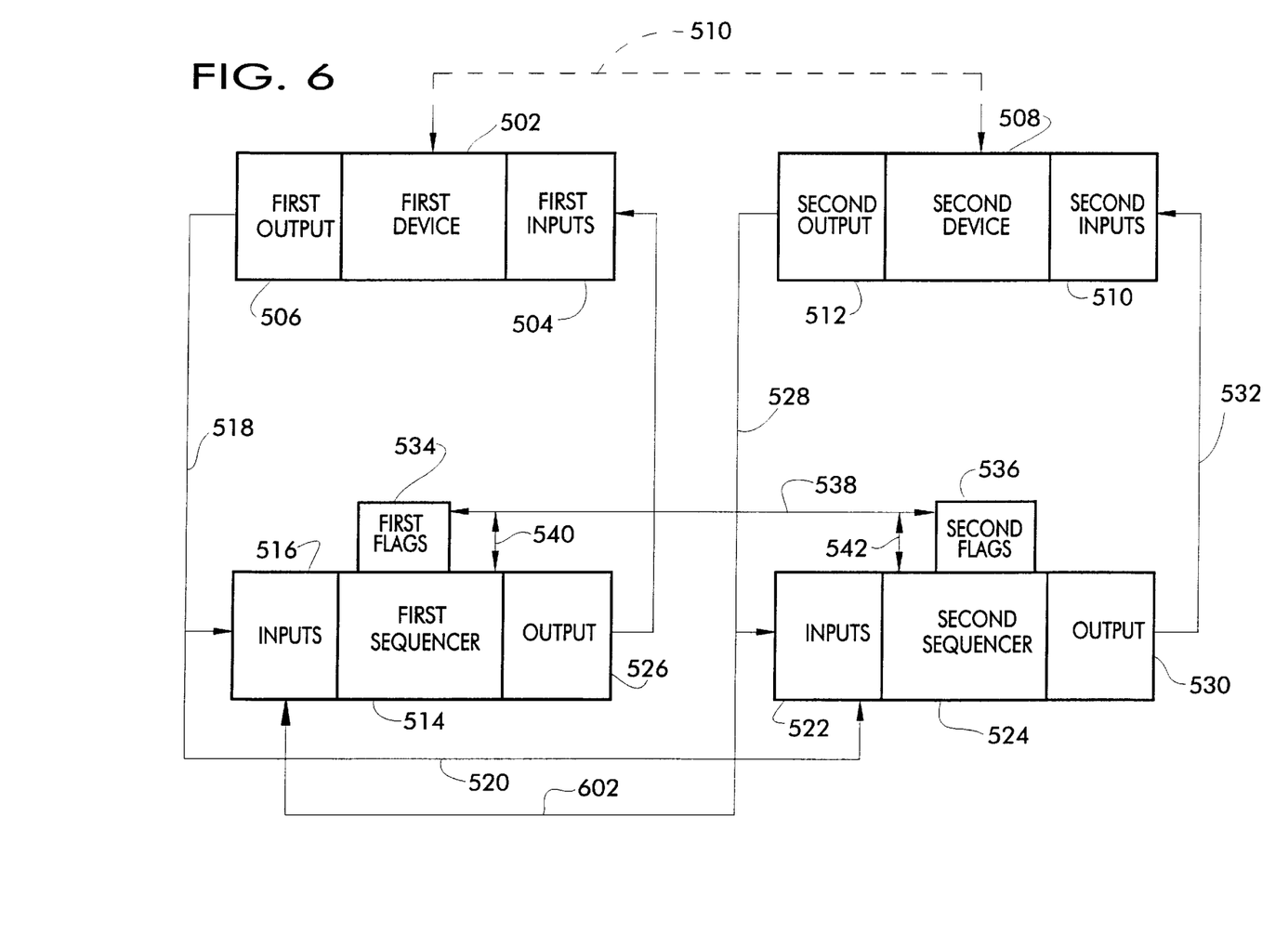
FIG. 6 is block diagram of one preferred embodiment of a system according to the invention in which an output of a first device is shared by first and second sequencers and in which an output of second device shared by first and second sequencers.

FIG. 6 illustrates a block diagram of one preferred embodiment of the system according to the invention in which an output of a first device is shared by the first and second sequencers and in which an output of the second device is shared by the first and second sequencers. In other words, FIG. 6 corresponds to FIG. 5 with the addition line 602 which links the second output 512 of the second device 508 with the inputs 516 of the first sequencer 514. As a result, the second output 512 of the second device 508 is a shared output. Therefore, the first serial sequencer 514 has an input 516 connected to the second output 512 of the second device 508, which is a shared output, for monitoring the status of the second device 508. As a result, the first device 502 is controlled by the first serial sequencer 514 in response to the status of the second device 508 as indicated to the first sequencer 514 via line 602.

Figure 7:
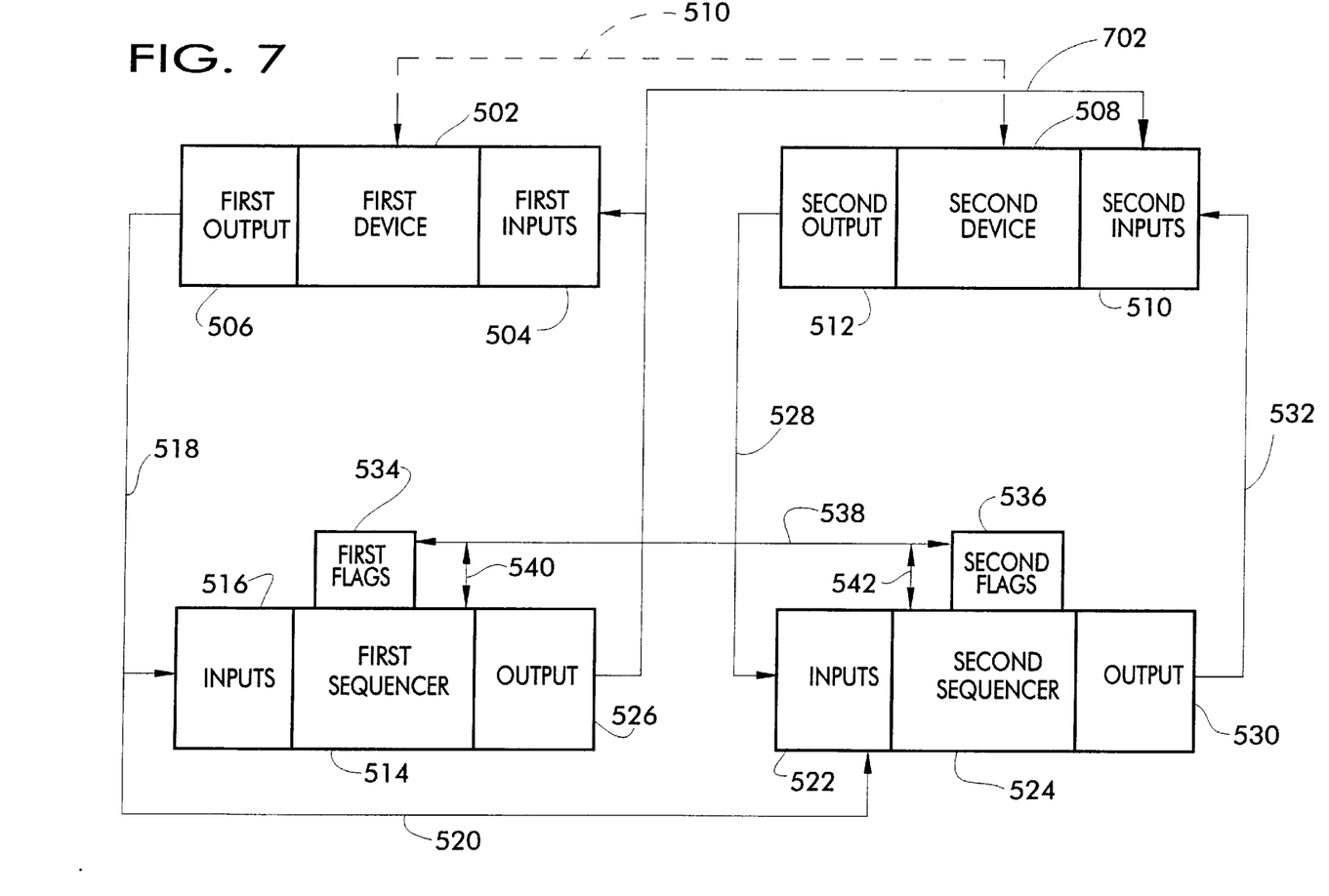
FIG. 7 is block diagram of one preferred embodiment of a system according to the invention in which an output of a first device is shared by the first and second sequencers and in which an output of the first sequencer is shared by the first and second devices.

FIG. 7 illustrates a block diagram of one preferred embodiment of the system according to the invention in which an output of the first device 502 is shared by the first and second sequencers and in which the output of the first sequencer 514 is shared by the first and second devices. In particular, FIG. 7 corresponds to FIG. 5 with the addition of line 702 which links the output 526 of the first sequencer 514 with the second inputs 510 of the second device 508. The outputs 526 of the first sequencer 514 are shared outputs in that such outputs are provided to the first inputs 504 of the first device 502 and also provided to the second inputs 510 of the second device 508. As a result, the second device 508 has its second outputs 510 connected to both the outputs 526 of the first sequencer 514 and the outputs 530 of the second sequencer 524. Therefore, the second device 508 responds to the first sequencer 514 via line 702 so that the second device 508 is controlled by both the first sequencer 524 via line 532 and by the second sequencer 514 via line 702.

Figure 8:
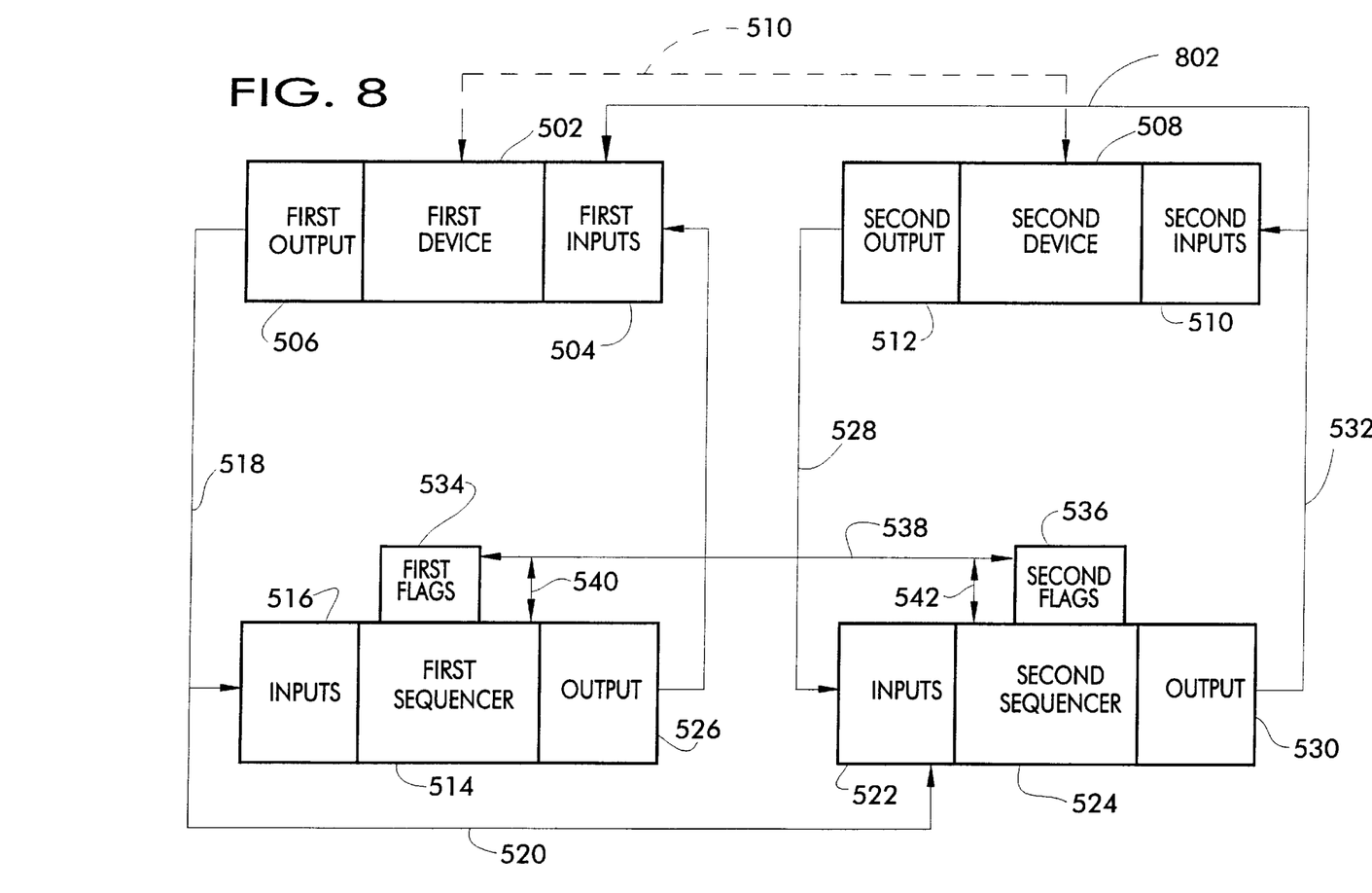
FIG. 8 is block diagram of one preferred embodiment of a system according to the invention in which an output of a first device is shared by the first and second sequencers and in which an output of the second sequencer is shared by the first and second devices.

FIG. 8 illustrates in block diagram form another preferred embodiment of the system of the invention in which outputs of the first device are shared by the first and second sequencers and outputs of the second sequencer are shared by the first and second devices. FIG. 8 corresponds to FIG. 5 with the addition of line 802 interconnecting the outputs 530 of the second sequencer 504 with the inputs 504 of the first device 502. As a result, the output 530 of the second sequencer 524 is a shared output which is provided to both the first and second devices. The first device has inputs 504 connected to the output 530 of the second sequencer 524 for responding to the second sequencer so that the first device 502 is controlled by both the first sequencer 514 and the second sequencer 524. [NEW:] The flags of FIGS. 5–8 are optional and are not necessary for operation of multiple sequencers according to the invention. For example, another preferred embodiment of the invention, which would be a variation of FIGS. 5–8, includes a system having a plurality of sequencers and a plurality of devices as shown in FIGS. 5–8 with no flags or with a limited number of flags. In this embodiment, each device would have a plurality of inputs, at least some of which would be shared and controlled by each and every sequencer. In addition, each device would have a plurality of outputs, at least some of which would be supplied to each and every sequencer. As a result, the sequencers would not be redundant but would be overlapping. This would allow any one sequencer to control or shut down any other sequencer and its corresponding device.

For example, such an embodiment may be employed when sequencers control a series of devices such as conveyor belts where one sequencer is used for controlling each belt. In the event that one of the belts malfunctions, the operation of the remaining sequencers and/or their belts may have to be initiated, shut down or modified until the malfunction is corrected. In this example, the sequencers would share a plurality of inputs and outputs so that any one sequencer could initiate, shut down or modify the operation of the remaining sequencers and/or their corresponding devices if certain conditions or events occur. Essentially, each sequencer would be in a master/slave relationship with the remaining sequencers so that each sequencer controls all remaining sequencers and each sequencer is subject to all other sequencers. One advantage to such a system is that it could be expanded or modified without limit by adding additional devices and their corresponding sequencers.

Figure 9:
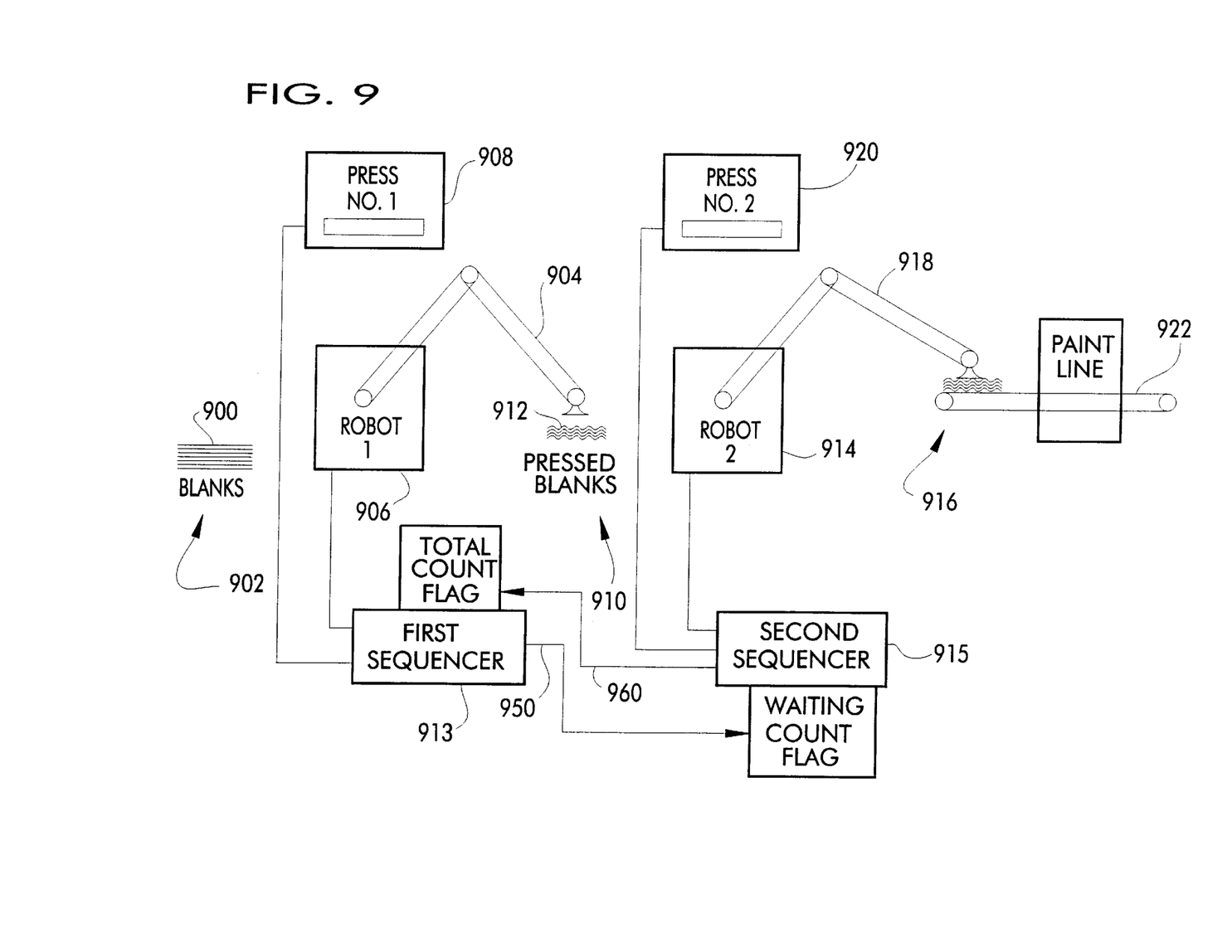
FIG. 9 is block diagram of one preferred embodiment of a system according to the invention in which the devices are robots which move blanks through an assembly line.

FIG. 9 illustrates a specific application of the invention in which the devices to be controlled are robots which move blanks through an assembly line. The process to be implemented by first and second sequencers is as follows: blanks 900 are to be picked up from the first area 902 by the arm 904 of the first robot 906 and inserted into a first press 908 for corrugating. Next, the first press 908 is activated to corrugate the blank therein. Next, the corrugated part is moved from the first press 908 to a holding area 910 at which place the corrugated parts 912 are stacked for further processing. After completion of this portion of the process, a first sequencer 913 controlling first robot 906 then begins its process over again by moving arm 504 to pick up the next blank 900 to be provided to the first press 908.

Simultaneously with the operation of the first robot 906, a second robot 914 is controlled by a second sequencer 915 to pierce the corrugated parts 912 and to move the pierced parts to a second area 916 where the corrugated parts 912 are painted. The corrugated parts 912 are picked up by the robot arm 918 from holding area 910 and inserted into second press 920 for hole piercing. The pierced, corrugated part is then moved by robot arm 918 from the second press 920 to the paint line belt 922 where it will be painted. After completion of this process, the second sequencer 915 controlling second robot 914 again executes a series of steps to move a corrugated part 912 from holding area 110 to the second press 920 for piercing and then to the belt 922 for painting. A third sequencer could separately control the paint line.

The first sequencer 913 would control first press 908 and first robot 906. Through its programmed steps, the first sequencer 913 would manipulate robot arm 904 to the stack of blanks 900, lift one blank and position it in the first press 908, activate the press, stack the newly corrugated part 912 at the holding area 910, increment or set its "total" count flag to indicate the number of parts 912 in holding area 910 and increment or set a "waiting" count flag of the second sequencer 915 via line 950 to indicate that a corrugated part 912 is in the holding area 910 and ready for piercing and painting.

In response to a "waiting" count flag greater than zero, the second sequencer 915 which is connected to and controlling the second press 920 and second robot 914 would manipulate robot arm 918 to pick up a corrugated part in the holding area 910. When the second sequencer instructs the second robot 914 to remove one of the corrugated parts 912 from the filled holding area 910, this would reset or decrement the "total" count flag of the first sequencer one count via line 960 to indicate that one more corrugated part could be placed in the holding area 910. Assuming the holding area 910 can accommodate a number of corrugated parts 912, the first sequencer would continue to operate until the holding area 910 was filled with corrugated parts 912 until the "total" count flag is at a maximum.

Simultaneously with and independently of the first sequencer 913, the second sequencer 915 instructs the second robot 914 to place the corrugated part into the second press 920 for piercing. After the corrugated part is pierced, it would be removed by the robot arm 918 and placed on the paint line belt 922. The third sequencer controlling the paint line has a flag indicating that it is ready for the next part to be painted.

It is important to understand that each of the sequencer steps is controlled by inputs usually provided from the device being controlled. For example, the first sequencer 913 has sensor inputs from the first robot 906 and the first press 908. Such inputs would indicate such things as whether blanks are available, whether a blank is in the first press being corrugated or whether a corrugated parts has been stacked in the holding area 910. In addition, the first sequencer 913 may be controlled by internal counters within the sequencer, timers, and by sensors which observe its flags or the flags of other sequencers.

Additionally, any inputs or outputs can be controlled by any sequencer. Therefore, the first sequencer 913 can look for and be responsive to the position of the second robot arm 918 in order to avoid a collision between the first arm 904 and the second arm 918 if the second robot 914 is picking up a corrugated part 912 at the same time that the first sequencer instructs the first robot arm 904 to place a corrugated part at the holding area 910. Similarly, the second robot 914 could turn on the paint line conveyor 922 after it places a pierced, corrugated part on the belt 922. Flags can also be observed, set, reset, incremented or decremented by any sequencer independent of which sequencer controls the flag in question.

Figure 10:
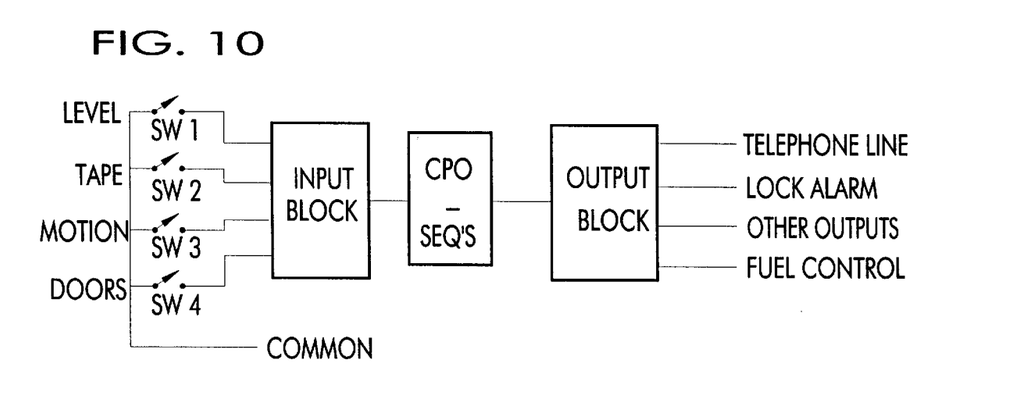
FIG. 10 is block diagram of another preferred embodiment of a system according to the invention in which the devices are switches for monitoring the status of the system and for providing alarm signals in the event that the status indicates an alarm condition.

FIG. 10 illustrates in block diagram form another preferred embodiment of a system according to the invention in which the devices are switches for monitoring the status of the system and for providing alarm signals in the event that the status indicates an alarm condition. For example, this application contemplates that a single system would be used to monitor both a particular process and the burglar alarm system which protects the building in which the process is being conducted. One sequencer would watch the process and switch SW1 which indicates the boiler feed water level. Switch SW1 would close if the water level were too low. If the low water switch SWI closes, the first sequencer would deactivate the fuel control output to turn off fuel, would activate the telephone line output to telephone someone of the problem, and deliver a synthesized message and would sound a local alarm via the local alarm output. A second sequencer could independently, simultaneously, and in parallel monitor the facility housing the process including such things as the window tape monitored by switch SW2, motion detectors monitored by switch SW3, and door switches monitored by switches SW4. Other detectors such as laser beams and fire, heat or smoke detectors may also be employed. If an intruder or problem is detected, an alarm would be tripped, a local alarm could be sounded, and a telephone line output could be activated to telephone the police.

The alarm applications are different than the many step sequencer programs in that the sequencer is set to scan through its steps quickly looking at each step for an open or closed circuit which should not be there. For example, depending on the circuit, different actions may be required. If multiple alarm functions are desired, each alarm function would require a separate sequencer. The sequencer scanning the boiler switches would be separate from the other sequencers scanning the windows so that the two sequencers would operate independently.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

We claim:

1. A system for controlling:
  a first device having a first input for controlling operation of the first device and having a first output indicating status of the first device, and
  a second device operating in conjunction with the first device and having a second input for controlling operation of the second device and having a second output indicating status of the second device;
  said system comprising:
  a first serial sequencer for controlling the first device, wherein the first output of the first device is a first shared output, said first serial sequencer having:
    an input connected to the first shared output of the first device for monitoring the status of the first device, and
    an output connected to the first input of the first device for controlling operation of the first device;
  and
  a second serial sequencer for controlling the second device and having:
    an input connected to the first shared output of the first device for monitoring the status of the first device,
    another input connected to the second output of the second device for monitoring the status of the second device, and
    an output connected to the second input of the second device for controlling operation of the second device;
  wherein said first and second serial sequencers operate simultaneously in parallel and independently of each other so that the first device is controlled by the first serial sequencer and the second device is controlled by the second serial sequencer in response to the status of the first device.

2. The system of claim 1 wherein the second output of the second device is a second shared output and wherein the first serial sequencer has another input connected to the second shared output of the second device for monitoring the status of the second device so that the first device is controlled by the first serial sequencer in response to the status of the second device.

3. The system of claim 1 wherein the output of the first sequencer is a shared output and wherein the second device has another input connected to the shared output of the first sequencer for responding to the first sequencer so that the second device is controlled by the first and second sequencers.

4. The system of claim 1 wherein the output of the second sequencer is a shared output and wherein the first device has another input connected to the shared output of the second sequencer for responding to the second sequencer so that the first device is controlled by the first and second sequencers.

5. The system of claim 1 wherein the first sequencer includes a first flag for inhibiting the first sequencer from providing a first particular output signal to the first device, wherein the second sequencer includes a second flag for inhibiting the second sequencer from providing a second particular output signal to the second device, and wherein the second sequencer is responsive to the first flag for inhibiting the second sequencer from providing a third particular output signal to the second device.

6. The system of claim 5 wherein the first sequencer resets the first flag, and wherein the second sequencer resets the first flag and second flag.

7. The system of claim 1 wherein the first device is a first robot for moving products from a first area to a holding area and wherein the second device is a second robot for moving the products from the holding area to a second area, and wherein the first robot is controlled by the first sequencer and the second robot is controlled by the second sequencer whereby the first and second robots operate simultaneously in parallel and independently of each other.

8. The system of claim 7 wherein the first sequencer includes a counter flag for inhibiting operation of the first robot when the number of products in the holding area is a maximum and wherein the second sequencer decrements the counter flag when it removes one of the products from the holding area so that the number of products in the holding area is less than a maximum.

9. The system of claim 1 further comprising an array of optical relays connected between the sequencer outputs and the device inputs for providing isolation.

10. The system of claim 1 further comprising signal conditioning circuits connected between the device outputs and the sequencer inputs.

11. The system of claim 1 wherein the devices are digital devices and the sequencers are digital sequencers.

12. The system of claim 1 wherein the devices are analog devices having inputs for controlling rate of movement and wherein the sequencers are analog sequencers.

13. A system for controlling:

a first device having a first input for controlling the operation of the first device and having a first output indicating status of the first device, and a second device operating in conjunction with the first device and having a second input for controlling operation of the second device and having a second output indicating status of the second device;

said system comprising:

a signal conditioning circuit for generating digital signals corresponding to signals provided by the first and second outputs; and a digital signal processor for analyzing the digital signals and providing signals to the first and second inputs, said processor executing a software program implementing:

a first serial sequencer for controlling the first device by evaluating the digital signals corresponding to the output signals of the first device, and by instructing the processor to generate an output supplied to the first input of the first device for controlling operation of the first device; and a second serial sequencer for controlling the second device by evaluating the digital signals corresponding to the output signals of the first and second devices, and by instructing the processor to generate an output supplied to the second input of the second device for controlling operation of the second device; and wherein said first and second serial sequencers operate simultaneously in parallel and independently of each other so that the first device is controlled by the first serial sequencer in response to the signals provided by the first output and the second device is controlled by the second serial sequencer in response to signals provided by the first and second outputs.

* * * * *